(12) United States Patent
Chafin et al.

(10) Patent No.: US 8,606,989 B2
(45) Date of Patent: Dec. 10, 2013

(54) METHODS AND APPARATUS FOR BURST DATA TRANSFERS BETWEEN DOUBLE DATA RATE (DDR) MEMORIES AND EMBEDDED PROCESSORS DURING TRAINING

(75) Inventors: Craig R. Chafin, Colorado Springs, CO (US); Carl Gygi, Colorado Springs, CO (US); Adam S. Browen, Colorado Springs, CO (US)

(73) Assignee: LSI Corporation, San Jose, CA (US)

( * ) Notice: Subject to any disclaimer, the term of this patent is extended or adjusted under 35 U.S.C. 154(b) by 493 days.

(21) Appl. No.: 12/872,731

(22) Filed: Aug. 31, 2010

(65) Prior Publication Data
US 2012/0054424 A1 Mar. 1, 2012

(51) Int. Cl.
*G06F 12/00* (2006.01)
*G06F 1/04* (2006.01)

(52) U.S. Cl.
USPC .................. 711/105; 711/167; 713/503

(58) Field of Classification Search
None
See application file for complete search history.

(56) References Cited

U.S. PATENT DOCUMENTS

| | | | |
|---|---|---|---|
| 5,974,478 A | 10/1999 | Wood et al. | |
| 6,092,225 A * | 7/2000 | Gruodis et al. | 714/724 |
| 2003/0196132 A1* | 10/2003 | Chiang | 713/503 |
| 2004/0215993 A1* | 10/2004 | Han et al. | 713/400 |
| 2005/0259476 A1* | 11/2005 | Nguyen et al. | 365/189.01 |
| 2007/0300014 A1* | 12/2007 | Bovitz | 711/114 |
| 2008/0168298 A1* | 7/2008 | Bellows et al. | 713/601 |
| 2008/0225603 A1* | 9/2008 | Hein | 365/189.05 |
| 2009/0244997 A1* | 10/2009 | Searles et al. | 365/194 |
| 2010/0313092 A1* | 12/2010 | Xu et al. | 714/738 |

OTHER PUBLICATIONS

Uchiyama et al., Architecture and Design of a Second-level Cache Chip with Copy-Back and 160MB/s Burst-Transfer Features, 1990 Symposium on VLSI Circuits, pp. 115-116.
Windows Vista Tips http://www.winvistatips.com/does-dma-burst-mean-t196380.html, pp. 1-3, downloaded May 4, 2010.
DRAM Write Timing / DRAM Burst Write Timing / DRAM Write Wait States, http://www.pcguide.com/ref/mbsys/bios/set/advchDRAMWrite-c.html, pp. 1-3, downloaded May 4, 2010.
Horton, Selecting the Right Cache Architecture for High Performance PCS, SOny Semiconductor Company of America, pp. 111-121, downloaded May 4, 2010.

* cited by examiner

*Primary Examiner* — Kaushikkumar Patel
(74) *Attorney, Agent, or Firm* — Ryan, Mason & Lewis, LLP

(57) ABSTRACT

Methods and apparatus are provided for burst transfers of data between DDR memories and embedded processors during training of the PHY interface in an embedded system. An embedded system comprises an embedded processor having at least one cache controller; a memory, wherein the memory has an atomic memory access that comprises a plurality of clock edges; and a memory controller having a physical interface to convert digital signals between the embedded processor and the memory, wherein the cache controller executes a training process to determine a delay through the physical interface for each of the plurality of clock edges using a burst transfer of data. The burst transfer comprises reading a data pattern from the memory and storing the data pattern in one or more registers in the embedded processor.

12 Claims, 5 Drawing Sheets

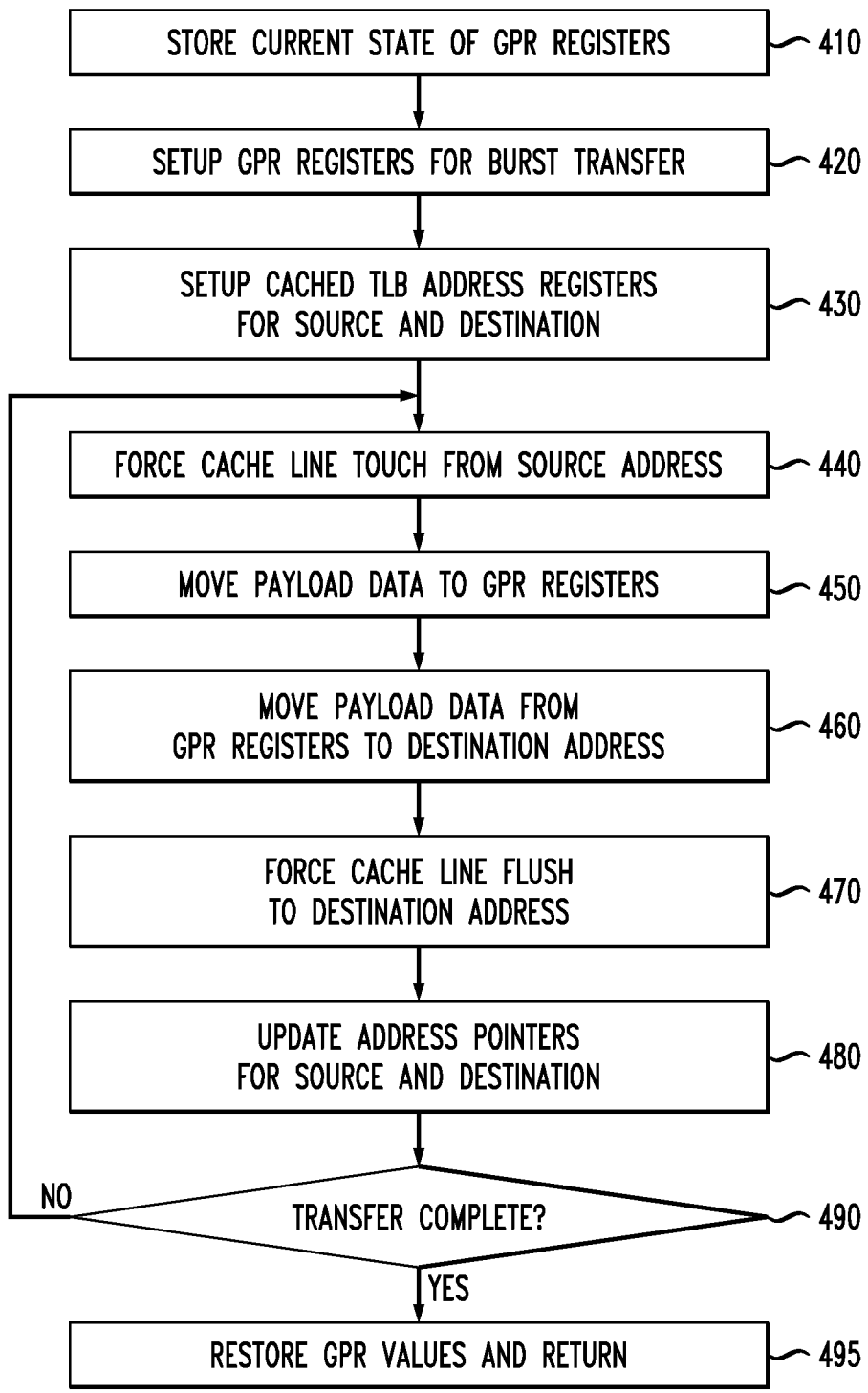

```
// save regs we will clobber
mr      r3, gprsave         // R3 - points to mem where we save off regs
stmw    r16, 0(r3)          // save off R16-R31

// get params for this function - note the 0x offsets below are
// important - must match the params struct
mr      r16, params         // R16 - params
                            // R17, R18 - tmp
// src TLB
lwz     r17, 0x04(r16)      // R17 - 0x04 = SrcTlb, word[1] - (real pSrc)
lwz     r18, 0x18(r16)      // R18 - 0x18 = SrcTlbNumb - TLB entry number
tlbwe   r17, r18, 1         // set src TLB entry
// dst TLB
lwz     r17, 0x10(r16)      // R17 - 0x10 = DstTlb, word[1] - (real pDst)
lwz     r18, 0x1C(r16)      // R18 - 0x1C = DstTlbNumb - TLB entry number
tlbwe   r17, r18, 1         // set dst TLB entry
// wait for TLB entries to take
msync                       // msync good enough // params continued
lwz     r19, 0x20(r16)      // R19 - 0x20 = src - src addr
lwz     r20, 0x24(r16)      // R20 - 0x24 = srcidx - part of the src addr
lwz     r21, 0x28(r16)      // R21 - 0x28 = dst - dst addr
lwz     r22, 0x2C(r16)      // R22 - 0x2C = dstidx - part of the dst addr
lwz     r23, 0x30(r16)      // R23 - 0x30 = bcount - # of 32 byte bursts
```

FIG. 5B

```
    // burst copy!
    mtctr   r23                 // load the counter
BurstLoop:
    // read: src ==> src-Dcache (PLB burst)
    dcbi    r19, r20            // invalidate src line
    dcbt    r19, r20            // touch src line - burst READ 32 byte
    // move: src-Dcache ==> REGS
    add     r17, r19, r20       // R17 tmp - src addr in Dcache
    lmw     r24, 0(r17)         // SRC cache to R24-R31
    // move: REGS ==> dst-Dcache
    dcbz    r21, r22            // zero and allocate dst line
    add     r17, r21, r22       // R17 tmp - dst addr in Dcache
    stmw    r24, 0(r17)         // R24-R31 to DST cache
    // write: dst-Dcache ==> dst (PLB burst)
    dcbf    r21, r22            // flush - burst WRITE 32 bytes to DST
    // update pointers
    addi    r20, r20, 0x20      // srcidx += 32
    addi    r22, r22, 0x20      // dstidx += 32
    bdnz    BurstLoop           // decrement counter - branch if counter != 0

// put the TLB entries back to unused mode
    // Default src TLB
    lwz     r17, 0x34(r16)      // R17 - 0x34 = SrcTlbWord1Default
    lwz     r18, 0x18(r16)      // R18 - 0x18 = SrcTlbNumb - TLB entry number
    tlbwe   r17, r18, 1         // set default src TLB entry
    // Default dst TLB
    lwz     r17, 0x38(r16)      // R17 - 0x38 = DstTlbWord1Default
    lwz     r18, 0x1C(r16)      // R18 - 0x1C = DstTlbNumb - TLB entry number
    tlbwe   r17, r18, 1         // set default dst TLB entry
    // wait for TLB entries to take
    msync                       // msync // restore the regs
    lmw     r16, 0(r3)          // restore R16-R31 before returning
```

METHODS AND APPARATUS FOR BURST DATA TRANSFERS BETWEEN DOUBLE DATA RATE (DDR) MEMORIES AND EMBEDDED PROCESSORS DURING TRAINING

FIELD OF THE INVENTION

The present invention relates to embedded systems having an embedded processor and related memories, and more particularly, to methods and apparatus for transferring burst data between an embedded processor and the related memories during a training process.

BACKGROUND OF THE INVENTION

When an embedded processor, such as a PowerPC™, interfaces with a Double Data Rate (DDR) memory in an embedded system, a DDR controller is typically employed to manage the flow of data between the devices. DDR memories transfer data on the rising and falling edges of the clock signal. The DDR controller typically interfaces to the DDR memory device using a Physical (PHY) interface that converts digital signals and commands from the DDR controller logic into waveforms that the DDR memory can interpret.

As the data rates between the DDR memory and embedded processor increase, it becomes increasingly important to determine the delay for each bit through the PHY interface. Thus, a training process is often implemented during the boot time of the embedded processor to properly train the PHY interface.

DDR memories are often divided into sections, referred to as "banks." This organization results in a minimum or atomic memory area that must be accessed for each read and write operation. Thus, during the training process, the atomic access constraints must be maintained and the delay must be measured for a minimum number of edges. Therefore, a burst mode is typically employed during training to provide a burst of data to analyze all edges at once within an atomic memory area. Generally, the training process reads a data pattern from a portion of the DDR memory and compares the data pattern that was read to the data pattern that was written to the DDR memory portion. If there is an error in the comparison, the training process updates the delay parameters.

The data patterns required for the training process are typically generated using a Direct Memory Access (DMA) engine to ensure a contiguous burst of data that satisfies the atomic memory requirements of the DDR memory. Setting up a DMA engine, however, can consume valuable memory resources and impact the boot performance. In addition, the DDR memory is often used to run code as well. Thus, the DDR memory typically must be functional as soon as possible. Setting up the DMA engine, however, is time consuming and slows down the boot process.

A need therefore exists for improved methods and apparatus for burst transfers of data between DDR memories and embedded processors during training of the PHY interface.

SUMMARY OF THE INVENTION

Generally, methods and apparatus are provided for burst transfers of data between DDR memories and embedded processors during training of the PHY interface in an embedded system. According to one aspect of the invention, an embedded system comprises an embedded processor having at least one cache controller; a memory, wherein the memory has an atomic memory access that comprises a plurality of clock edges; and a memory controller having a physical interface to convert digital signals between the embedded processor and the memory, wherein the cache controller executes a training process to determine a delay through the physical interface for each of the plurality of clock edges using a burst transfer of data. The embedded processor may comprise, for example, a PowerPC™ and the memory may comprise, for example, a double data rate (DDR) memory.

The burst transfer comprises the steps of reading a data pattern from the memory and storing the data pattern in one or more registers in the embedded processor. The data pattern that is read from the memory is compared to a data pattern that was previously written to the memory.

A more complete understanding of the present invention, as well as further features and advantages of the present invention, will be obtained by reference to the following detailed description and drawings.

BRIEF DESCRIPTION OF THE DRAWINGS

FIG. 4 is a flow chart describing an exemplary implementation of a training process that incorporates features of the present invention; and FIGS. 5A and 5B, collectively, comprise exemplary assembly code to implement the training process of FIG. 4.

DETAILED DESCRIPTION

The present invention provides improved methods and apparatus for burst transfers of data between DDR memories and embedded processors during training of the PHY interface. The present invention leverages the resources of the embedded processor to control and implement the training of the PHY interface. According to one aspect of the invention, a cache controller in the embedded processor executes the training process and controls the burst transfer. According to another aspect of the invention, the data patterns that are read from the DDR memory during training are stored in one or more registers in the embedded processor so that they can be compared to the data patterns that were written in the DDR memory.

Figure 1:
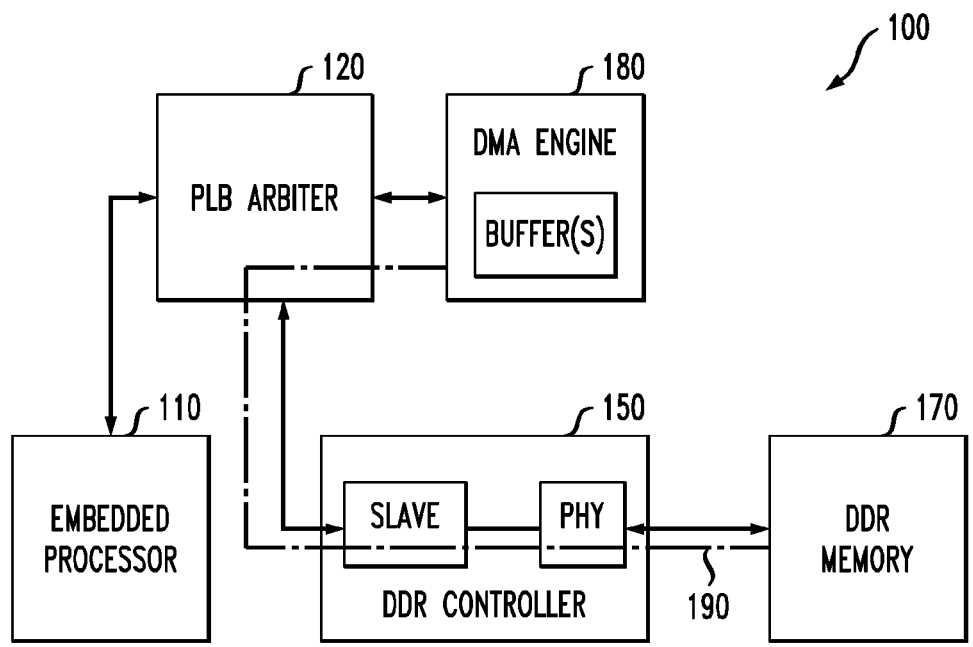
FIG. 1 illustrates a conventional embedded processor environment in which the present invention can operate.

FIG. 1 illustrates a conventional embedded processor environment 100 in which the present invention can operate. As shown in FIG. 1, the conventional embedded processor environment 100 comprises an embedded processor 110 interfacing with a DDR memory 170 by means of a DDR controller 150.

The DDR controller 150 comprises a PHY interface to the DDR memory 170 that converts digital signals and commands from the DDR controller 150 into waveforms that the DDR memory 170 can interpret. In addition, the DDR controller 150 comprises a Processor Local Bus (PLB) slave to interface communications on the PLB bus. Generally, the PLB bus is a high-performance, on-chip bus. A PLB arbiter 120 controls access to the PLB bus, in a known manner.

As previously indicated, the data patterns required for the training process are typically generated by a DMA engine 180 to ensure a contiguous burst of data that satisfies the atomic memory requirements of the DDR memory 170. The present invention recognizes, however, that setting up the DMA engine 180 consumes valuable memory resources and time and therefore negatively impacts the boot performance.

FIG. 1 also includes a dotted line indicating a data path 190 for the training process. Generally, during the training process, the DMA engine 180 reads a data pattern from the DDR memory 170, stores the read pattern in one or more buffers that may be internal or external to the DMA engine 180. The DMA engine 180 (or the processor, if external memory is used) then compares the data pattern that was read to the data pattern that was written by the DMA engine 180 to the DDR memory 170.

Figure 2:
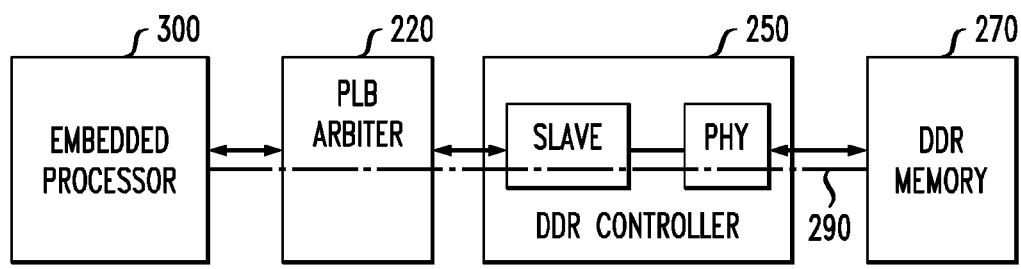
FIG. 2 illustrates an embedded processor environment that incorporates features of the present invention.

FIG. 2 illustrates an embedded processor environment 200 that incorporates features of the present invention. As shown in FIG. 2, the embedded processor environment 200 comprises an embedded processor 300 interfacing with a DDR memory 270 by means of a DDR controller 250. The embedded processor 300 is discussed further below in conjunction with FIG. 3 and may be implemented, for example, as a PowerPC™.

The DDR controller 250 comprises a PHY interface to the DDR memory 270 that converts digital signals and commands from the DDR controller 250 into waveforms that the DDR memory 270 can interpret. In addition, the DDR controller 250 comprises a Processor Local Bus (PLB) slave to interface communications on the PLB bus. A PLB arbiter 220 controls access to the P LB bus, in a known manner.

The training process in accordance with the present invention is discussed further below in conjunction with FIGS. 3-5. FIG. 2 also includes a dotted line indicating a data path 290 for the training process incorporating features of the present invention.

Figure 3:
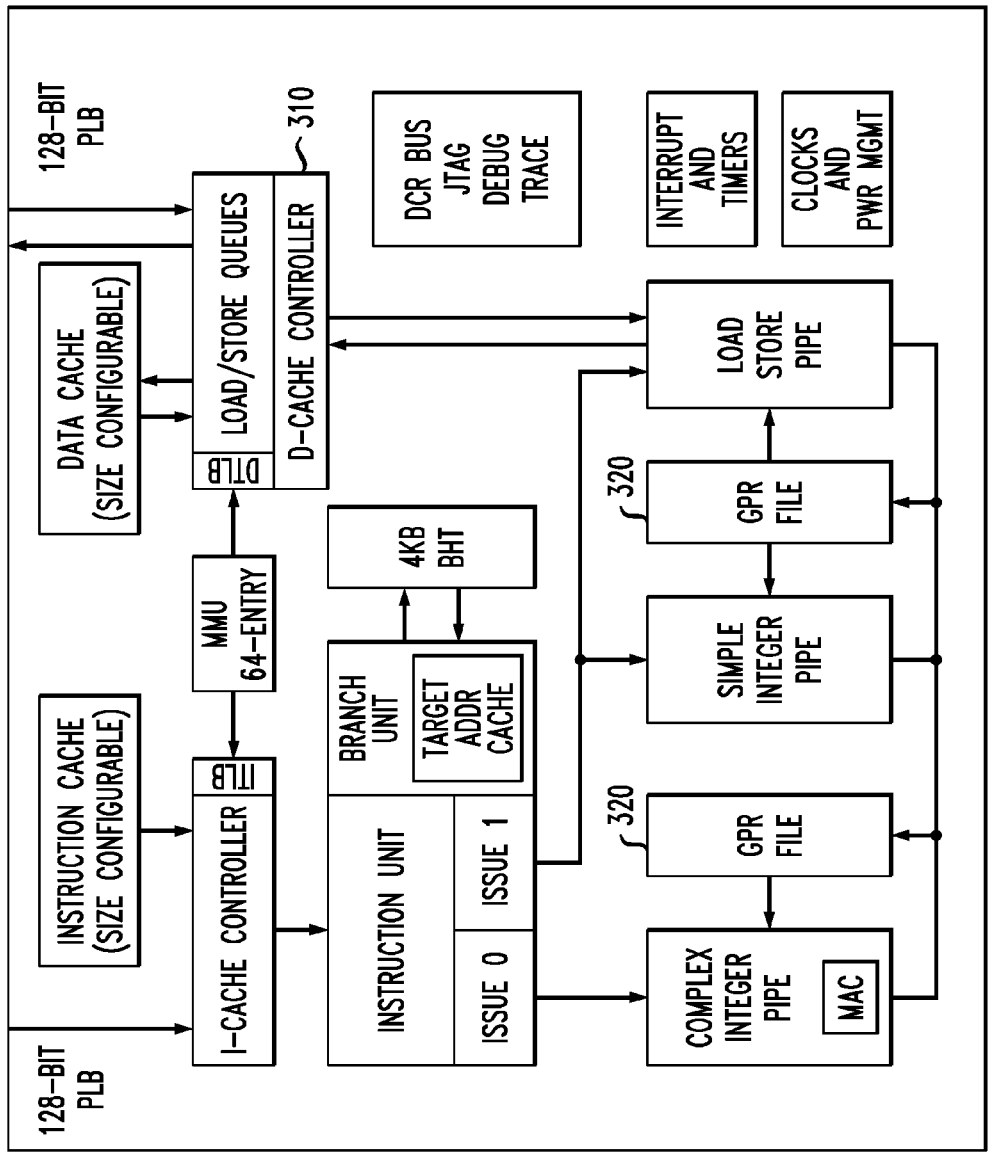
FIG. 3 is a schematic block diagram of an exemplary embedded processor.

FIG. 3 is a schematic block diagram of an exemplary embedded processor 300. The exemplary embedded processor 300 is embodied as a PowerPC™ 440x. As shown in FIG. 3, the exemplary embedded processor 300 comprises a data cache controller 310 and a plurality of General Purpose Registers (GPRs) 320, which are relevant to the present invention. For a more detailed discussion of the exemplary PowerPC™ 440x, see, for example, IBM Corp. "PPC440x4 CPU Core User's Manual," which can be downloaded, for example, from https://www-01.ibm.com/chips/techlib/techlib.nsf/techdocs/A2469EBB494D11AC872570D90060F049/$file/ppc440x4_um.pdf. The data cache controller 310 implements a training process 400, discussed further below in conjunction with FIG. 4, incorporating aspects of the present invention.

FIG. 4 is a flow chart describing an exemplary implementation of a training process 400 that incorporates features of the present invention. As shown in FIG. 4, the exemplary training process 400 initially stores the current state of the GPR registers 320 during step 410. Generally, the GPR registers 320 are required to store temporary data, so the original values are saved off during step 410 to a pre-determined stack in local memory. In an exemplary implementation, 16 GPR registers are needed for the storage of payload data and parameters.

Thereafter, the training process 400 sets up the GPR registers 320 for a burst transfer during step 420. For example, the parameter registers are setup for source address, destination address, transfer size (in multiples of the cache line size), and two free translation look-aside buffer (TLB) entry numbers. The cached TLB address registers for both the source and destination are setup during step 430. Since any address can come into this function, two unique TLB entries must be setup for the source address and for the destination address. The TLB entries are marked as cached to enable the cache controller 310.

During step 440 a cache line touch is forced from the source address. A cache line touch is initiated to the source address to load the cache line with the data (thereby accomplishing a burst read of 32 bytes). The payload data is then moved from the read cache line to the GPR registers 320 during step 450. Thereafter, the payload data is moved from the GPR registers 320 to the indicated destination address (i.e., the write cache line) during step 460.

A cache line flush is initiated to the destination address during step 470 to empty the cache line containing the data (thereby accomplishing a burst write of 32 bytes).

During step 480, the training process 400 updates the address pointers for the source and destination. A test is performed during step 490 to determine if the transfer is complete. If it is determined during step 490 that the transfer is not complete, then steps 440 through 480 are repeated if there is more data to be moved. If, however, it is determined during step 530 that the transfer is complete, then the TLB entries that were marked as cacheable are now disabled. This is to ensure the automatic cache hardware does not pre-fetch any more data. In addition, the GPR values are restored in the registers 320 during step 495 to their original values (from the stack saved off in step 410) and program control returns.

FIGS. 5A and 5B, collectively, comprise exemplary assembly code 500 to implement the training process 400 of FIG. 4. While FIGS. 5A and 5B show an exemplary sequence of steps, it is also an embodiment of the present invention that the sequence may be varied. Various permutations of the algorithm are contemplated as alternate embodiments of the invention.

In this manner, the burst transfer is setup quickly, initiated without the need to construct a reduced DMA engine initialization, and the code implementation is compact. In addition, the temporary, reduced DMA engine setup overhead is completely removed. The embedded processor typically runs at many multiples faster than the PLB clock speed. Thus, the overall time to run this code 500 is minimal.

In one exemplary variation, the code 500 can be constructed to use only one TLB entry instead of two. In a further variation, pre-determined, hard coded TLB entry numbers could be used instead of passed in values. Parameters could be reduced by using other local memory stacks. In addition, address indices can be computed, instead of passed in to the code 500 as parameters. In yet another variation, hard coded patterns could be only written or read instead of a generic memory copy function.

While exemplary embodiments of the present invention have been described with respect to digital logic blocks, as would be apparent to one skilled in the art, various functions may be implemented in the digital domain as processing steps in a software program, in hardware by circuit elements or state machines, or in combination of both software and hardware.

Such software may be employed in, for example, a digital signal processor, application specific integrated circuit, micro-controller, or general-purpose computer. Such hardware and software may be embodied within circuits implemented within an integrated circuit.

Thus, the functions of the present invention can be embodied in the form of methods and apparatuses for practicing those methods. One or more aspects of the present invention can be embodied in the form of program code, for example, whether stored in a storage medium, loaded into and/or executed by a machine, or transmitted over some transmission medium, wherein, when the program code is loaded into and executed by a machine, such as a computer, the machine becomes an apparatus for practicing the invention. When implemented on a general-purpose processor, the program code segments combine with the processor to provide a device that operates analogously to specific logic circuits. The invention can also be implemented in one or more of an integrated circuit, a digital signal processor, a microprocessor, and a micro-controller.

System and Article of Manufacture Details

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, memory cards, semiconductor devices, chips, application specific integrated circuits (ASICs)) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

The computer systems and servers described herein each contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

It is to be understood that the embodiments and variations shown and described herein are merely illustrative of the principles of this invention and that various modifications may be implemented by those skilled in the art without departing from the scope and spirit of the invention.

We claim:

1. An embedded system, comprising:
   an embedded processor having at least one cache controller;
   a memory, wherein said memory has an atomic memory access that comprises a plurality of clock edges; and
   a memory controller having a physical interface configured to convert digital signals between said embedded processor and said memory, wherein said cache controller executes a training process to determine a delay through said physical interface for each of said plurality of clock edges using a burst transfer of data.

2. The embedded system of claim 1, wherein said memory comprises a double data rate (DDR) memory.

3. The embedded system of claim 1, wherein said burst transfer comprises reading a data pattern from said memory and storing said data pattern in one or more registers in said embedded processor.

4. The embedded system of claim 3, wherein said read data pattern is compared to a data pattern that was written in said memory.

5. A method performed by a cache controller in an embedded processor in an embedded system for determining a delay through a physical interface, said method comprising:
   writing a data pattern to a memory in said embedded system, wherein said memory has an atomic memory access that comprises a plurality of clock edges;
   reading said data pattern from said memory using a burst transfer and a memory controller, wherein said memory controller employs said physical interface to convert digital signals between said embedded processor and said memory; and
   determining said delay through said physical interface for each of said plurality of clock edges based on said burst transfer.

6. The method of claim 5, wherein said memory comprises a double data rate (DDR) memory.

7. The method of claim 5, wherein said burst transfer comprises the steps of reading a data pattern from said memory and storing said data pattern in one or more registers in said embedded processor.

8. The method of claim 7, wherein said read data pattern is compared to a data pattern that was written in said memory.

9. An article of manufacture for determining a delay through a physical interface in an embedded system having an embedded processor containing a cache controller, comprising a machine readable recordable storage medium containing one or more programs which when executed by said cache controller implement the steps of:
   writing a data pattern to a memory in said embedded system, wherein said memory has an atomic memory access that comprises a plurality of clock edges;
   reading said data pattern from said memory using a burst transfer and a memory controller, wherein said memory controller employs said physical interface to convert digital signals between said embedded processor and said memory; and
   determining said delay through said physical interface for each of said plurality of clock edges based on said burst transfer.

10. The article of manufacture of claim 9, wherein said memory comprises a double data rate (DDR) memory.

11. The article of manufacture of claim 9, wherein said burst transfer comprises the steps of reading a data pattern from said memory and storing said data pattern in one or more registers in said embedded processor.

12. The article of manufacture of claim 11, wherein said read data pattern is compared to a data pattern that was written in said memory.

* * * * *